May 8, 1962 S. G. ENDERS 3,033,312
LUBRICATION MEANS FOR MECHANISM OF THE SCOTCH YOKE TYPE
Filed Sept. 12, 1960 4 Sheets-Sheet 1
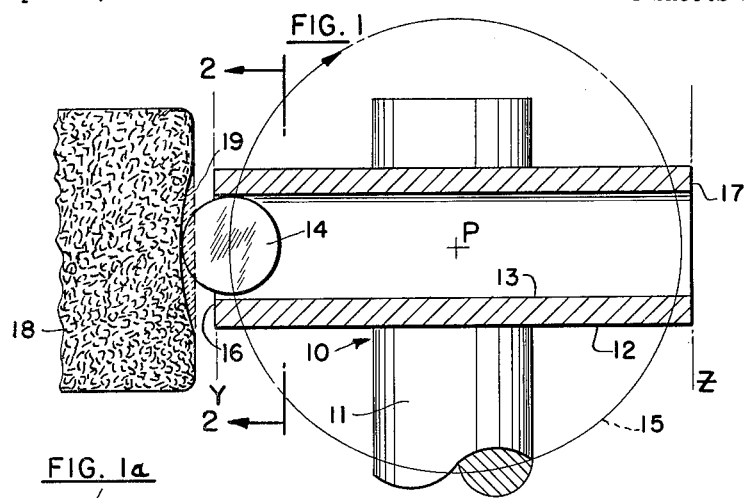
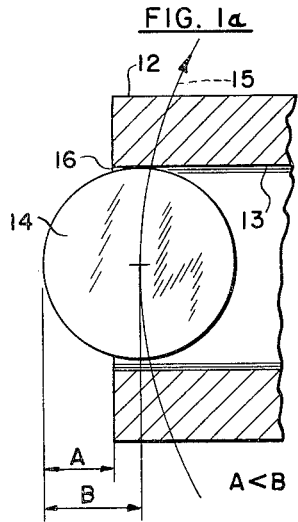
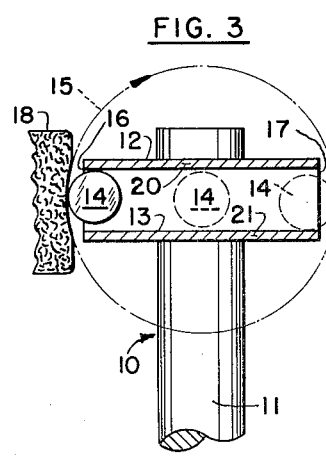
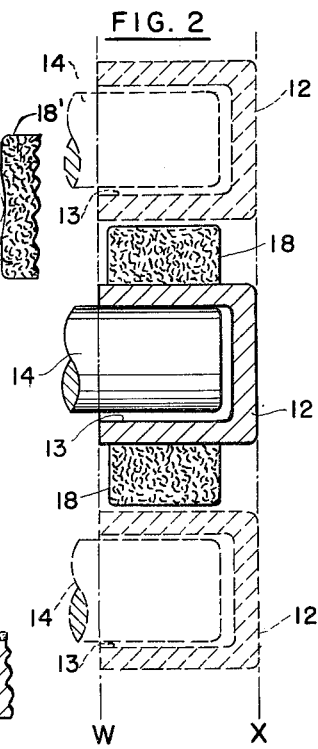
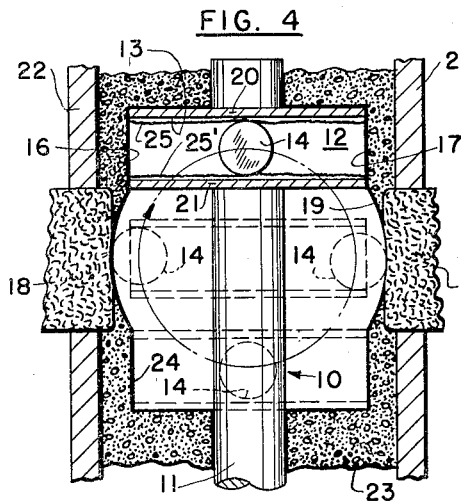
INVENTOR
SHERWOOD G. ENDERS
BY Leonard Bloom
ATTORNEY May 8, 1962 S. G. ENDERS 3,033,312
LUBRICATION MEANS FOR MECHANISM OF THE SCOTCH YOKE TYPE
Filed Sept. 12, 1960 4 Sheets-Sheet 2
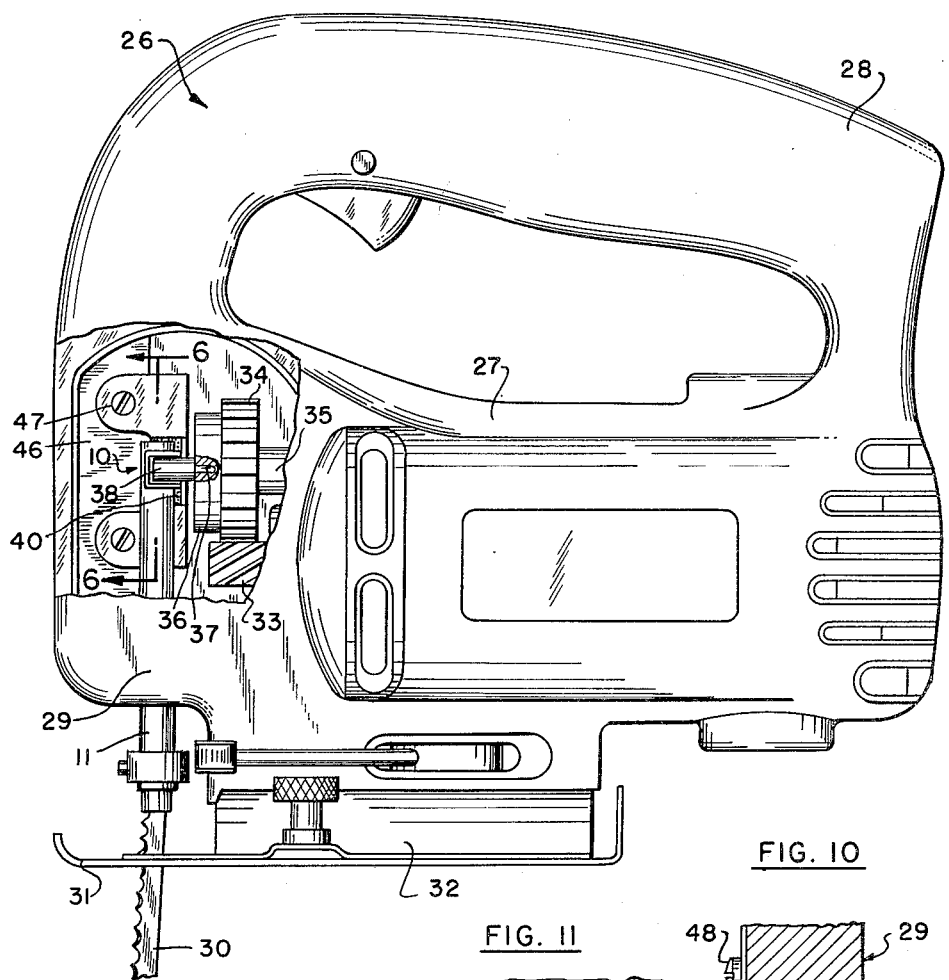
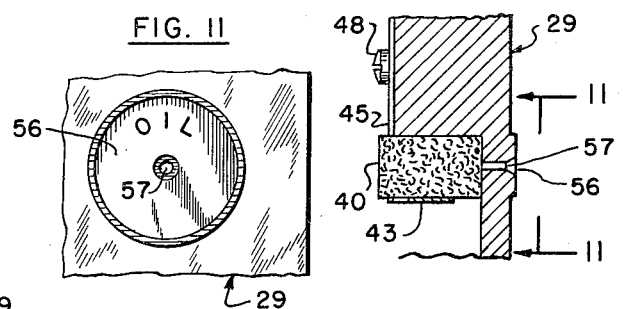
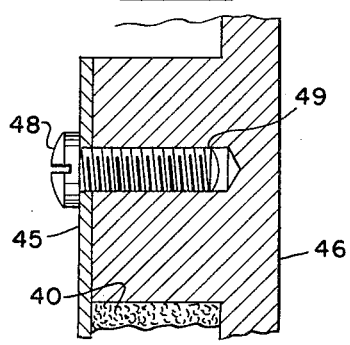
INVENTOR
SHERWOOD G. ENDERS
BY *Leonard Bloom*
ATTORNEY May 8, 1962 S. G. ENDERS 3,033,312
LUBRICATION MEANS FOR MECHANISM OF THE SCOTCH YOKE TYPE
Filed Sept. 12, 1960 4 Sheets-Sheet 3

INVENTOR
SHERWOOD G. ENDERS
BY *Leonard Bloom*
ATTORNEY

May 8, 1962 S. G. ENDERS 3,033,312
LUBRICATION MEANS FOR MECHANISM OF THE SCOTCH YOKE TYPE
Filed Sept. 12, 1960 4 Sheets-Sheet 4
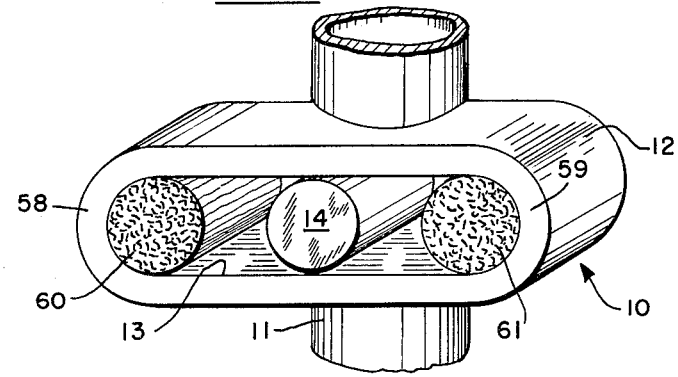
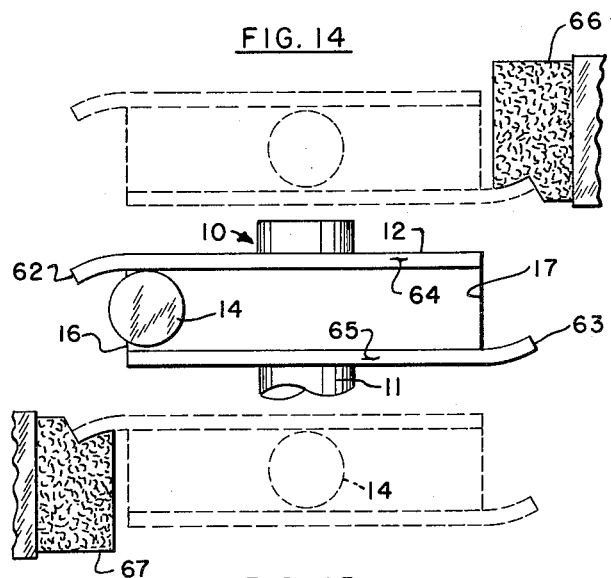
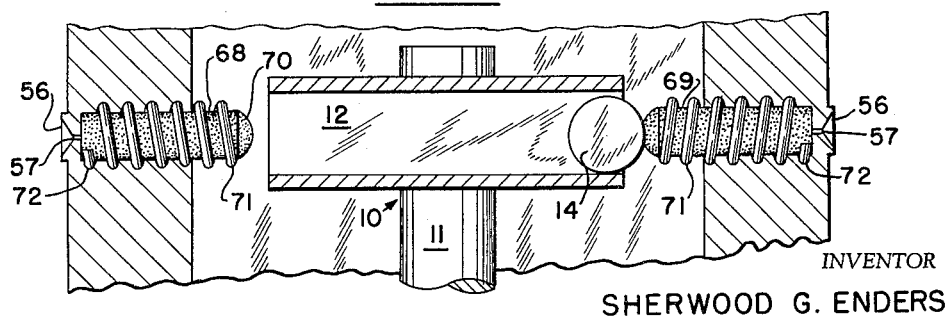
INVENTOR
SHERWOOD G. ENDERS
BY *Leonard Bloom*
ATTORNEY

United States Patent Office 3,033,312
Patented May 8, 1962

3,033,312
LUBRICATION MEANS FOR MECHANISM OF THE SCOTCH YOKE TYPE
Sherwood G. Enders, Bowleys Quarters, Md., assignor to The Black and Decker Manufacturing Company, Towson, Md., a corporation of Maryland
Filed Sept. 12, 1960, Ser. No. 55,320
22 Claims. (Cl. 184—5)

The present invention relates to lubrication means for a motion-translating mechanism, and more particularly, to lubrication means for a mechanism of the Scotch yoke type.

Over the years, the Scotch yoke mechanism has been a favorite with designers and engineers. Its advantages are simplicity, ease of assembly, and low cost. Basically, the Scotch yoke mechanism comprises a reciprocating shaft to which is secured a transverse yoke, in combination with eccentric means guided within the yoke. The yoke is generally channel-shaped and is usually open-ended for ease of construction; and the eccentric means usually includes a crank pin, which preferably carries a roller. The crank pin may be formed on, or otherwise secured to, the forward face of a flywheel (or gear) and is guided within the track formed by the yoke. As the flywheel rotates, the crank pin roller carried by it is constrained to reciprocate within the transverse yoke; and hence, the rotary motion of the flywheel is converted to the reciprocating motion of the yoke, which is in turn imparted to the shaft.

In conjunction with the widespread use of the Scotch yoke mechanism, one problem that has arisen, in particular, concerns the means by which the mechanism and the various wearing components thereof may be properly lubricated. In enclosed applications, a suitable lubricant of relatively-low viscosity, such as a quantity of grease, is invariably packed around the mechanism; but because of the reciprocating movement of the shaft and its integral yoke, the grease soon tends to "spread," that is to say, the grease is moved or thrown away from the mechanism and ceases to be effective in providing the proper degree of lubrication, especially for the wearing components such as the crank pin and the track formed in the yoke. In lieu of proper lubrication, the prior art has resorted to oversize components formed from expensive materials and specially-treated to be wear-resistant, but there is a physical limit to the degree to which the wearing qualities of such components may be optimized; and besides, for balance and better overall operation, it is desirable to have the Scotch yoke mechanism as lightweight as possible. Of course, a complicated series of internal oil grooves or passageways could be restored to, but this would defeat the basic purpose of simplicity inherent in the Scotch yoke mechanism itself, and moreover, would weaken its mechanical strength or durability. Naturally, the entire mechanism could be immersed in oil; but this would envision a totally-enclosed application necessitating special-sealing precautions, and hence in most cases this, too, would be impractical. As a result, the related problems of lubrication and wear are invariably present and are especially pronounced in high-speed, highly-loaded applications where space is at a premium; such applications may be encountered, for example, in certain types of portable electric tools, such as a jig saw.

Accordingly, it is an object of the present invention to alleviate these difficulties by providing a simple and effective lubrication means for a mechanism of the Scotch yoke type.

It is another object of the present invention to provide a lubrication means which will accommodate the use of a lighter Scotch yoke mechanism formed from inexpensive and ready-available materials.

It is yet another object of the present invention to provide lubricant means including a lubricant reservoir, together with means to transfer lubricant from the lubricant reservoir to the track of the reciprocating yoke at certain times during the operating cycle of the Scotch yoke mechanism.

It is a further object of the present invention to provide lubricant means including a pair of lubricant reservoirs, together with means to transfer lubricant to the track of the reciprocating yoke from the pair of lubricant reservoirs, in sequence, at certain times during the operating cycle of the Scotch yoke mechanism.

It is a still further object of the present invention to provide a lubricant applicator for use in conjunction with a motion-translating mechanism of the Scotch yoke type.

It is a yet still further object of the present invention to provide lubricant means including a pair of lubricant applicators, together with means whereby the eccentric means contacts each of the pair of lubricant applicators, in sequence, at certain times during the operating cycle of the mechanism.

It is yet still another object of the present invention to provide a pair of oil wicks, in conjunction with means whereby the crank pin wipes against a respective one of the pair of oil wicks, in sequence, at certain times during the operating cycle of the mechanism.

It is a further contemplated object of the present invention to provide a grease channel which tends to confine (to the track) the oil that is picked up by the crank pin.

These and other objects of the present invention will become apparent from a reading of the following specification taken in conjunction with the enclosed drawings, in which:

FIGURE 1 is a right front elevation of a major portion of a Scotch yoke mechanism, showing the conjunctive use of a lubricant applicator;

FIGURE 1a is an enlarged view of a portion of FIGURE 1, showing the amount by which the eccentric means may extend beyond the open end of the track;

FIGURE 2 is a view taken along the lines 2—2 of FIGURE 1, showing in phantom view the alternate positions of the yoke and eccentric means;

FIGURE 3 is a right front elevation similar to that of FIGURE 1, but showing the conjunctive use of a pair of lubricant applicators, the alternate positions of the eccentric means being shown in phantom;

FIGURE 4 is a view corresponding to that of FIGURE 3, but showing the alternate positions of the yoke in phantom, and further showing the channel formed in the quantity of grease that is packed around the mechanism;

FIGURE 4a is an enlarged view of a portion of FIGURE 4, showing the oil film that collects on the track portion of the yoke;

FIGURE 5 shows a particular application of the lubrication means of the present invention to a Scotch yoke mechanism used in a portable electric jig saw;

FIGURE 10 is a view taken along the lines of 10—10 of FIGURE 9, showing the oil duct leading to the wick;

FIGURE 11 is a view taken along the lines of 11—11 of FIGURE 10, showing an oil hole by means of which the supply of oil may be replenished;

FIGURE 12 is a view taken along the lines 12—12 of FIGURE 9;

FIGURE 13 shows a first modification of the present invention in which the yoke has a pair of closed ends, and a pair of lubricant applicators are secured within the yoke adjacent to the ends thereof;

FIGURE 14 shows a second modification of the present invention in which lubricant is transferred to the track at the advanced and retracted positions of the reciprocating yoke; and FIGURE 15 shows a third modification of the present invention in which the lubricant applicators are secured within the housing by means other than the mounting brackets as illustrated in FIGURES 5–12.

Figure 6:
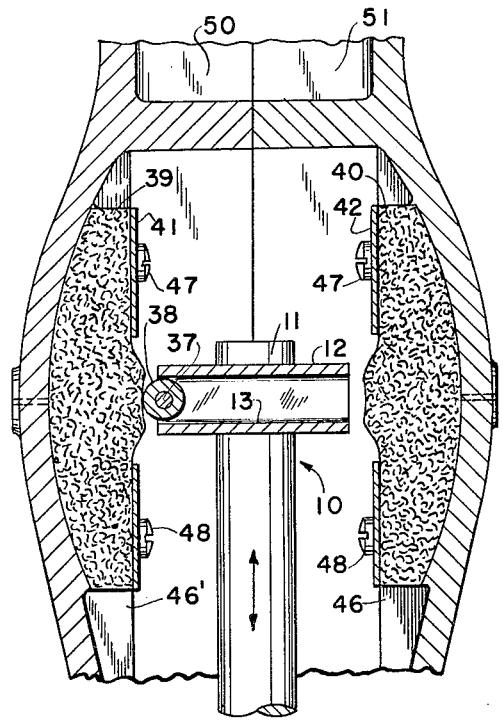
FIGURE 6 is an enlargement of a view taken along the lines 6—6 of FIGURE 5.

With reference to FIGURE 1, there is illustrated the major portion of a Scotch yoke mechanism 10, which includes a reciprocating shaft 11, a transverse yoke 12 secured to the shaft 11, a track 13 formed within the yoke 12, and eccentric means (denoted generally at 14) guided within the track 13. It will be appreciated that the eccentric means 14 may be a conventional crank pin secured to the forward face of the usual gear or flywheel (not shown for ease of illustration), and that the eccentric means 14 will travel in a circle, indicated as at 15, as it is guided or constrained within the track 13 of the yoke 12, thus imparting the usual reciprocating motion to the shaft 11. Hence, as illustrated in FIGURE 2, the yoke 12 will have a degree of reciprocation (from an advanced position to a retracted position) as indicated by the phantom lines.

With reference to FIGURES 1 and 2, it will be appreciated that the yoke 12, in its usual reciprocation, will describe a zone of travel bounded by parallel planes W and X (see FIGURE 2), and that the ends 16 and 17 of the yoke 12 (see FIGURE 1) move in respective planes Y and Z. In the embodiment of the invention illustrated in FIGURES 1 and 2, a lubricant applicator 18 is positioned within the zone of travel of the yoke 12 and near to the plane of travel Y of one of the ends 16 of the yoke 12. As shown in FIGURE 1, the end 16 of the yoke 12 (as well as end 17) is open, the yoke 12 being channel-shaped for economy of manufacture; and means are provided to allow the eccentric means 14 to extend slightly beyond one of the ends (end 16) of the yoke 12 to contact the lubricant applicator 18 at a certain time (or times) during the operating cycle of the mechanism 10. Such means take the convenient form of deliberately making the length of the yoke 12 such that the eccentric means 14 will extend slightly beyond the open end 16 of the yoke 12 during the midpoint of reciprocation of the yoke 12 (either in advancing or retracting, depending upon the direction of rotation of the eccentric means 14) such that the eccentric means 14 is allowed to contact or wipe against a portion of the lubricant applicator 18, which of course may be positioned near either end (16 or 17) of the yoke 12. In such a manner, a lubricant (such as oil) is picked up by the eccentric means 14 and is ultimately deposited or transferred to the track 13 within the yoke 12. Moreover, the eccentric means 14 contacts the lubricant applicator 18 along a curved surface that may be represented by the arcuate line (denoted by the numeral 19 in FIGURE 1) formed along a radius having its center at the midpoint P of the yoke 12, it being appreciated that the arcuate line 19 lies on the circle described by the remotest point of the eccentric means 14. The lubricant applicator 18 may be formed with a depression (corresponding to that of the arcuate line 19), or the lubricant applicator 18 may be formed originally with a perfectly flat face, in which case it will be appreciated, naturally, that due to the constant use thereof, the lubricant applicator 18 will eventually acquire (as shown by the phantom sectioning lines) a central depression corresponding substantially to that as represented by the arcuate line 19.

With reference to FIGURE 1a, there is illustrated a dimension (denoted as A) by which amount the eccentric means 14 extends beyond the open end 16 of the yoke 12. On the other hand, the radius of the eccentric means 14 (which may be a pin or roller) may be denoted by the letter B; and for mechanical considerations, it is noted that (preferably) the dimension A is less than the dimension B, that is to say, the eccentric means 14 is allowed to extend beyond the open end 16 of the yoke 12 by an amount equal to less than the radius of the eccentric means 14.

With reference to FIGURE 3, there is illustrated a pair of lubricant applicators 18 and 18′, each being positioned within the zone of travel of the reciprocating yoke 12 (as aforesaid), and one each being positioned near to a respective one of the open ends 16 and 17 of the yoke 12. The eccentric means 14 thus may contact (or wipe against) lubricant applicator 18 on the upstroke (or advancement) of shaft 11 and integral yoke 12, and lubricant applicator 18′ on the downstroke (or retraction) of the shaft 12 (as shown in phantom view); and it will be appreciated that this wiping action of the eccentric means 14 against the lubricant applicators 18 and 18′ occurs, in sequence, at the midpoints of travel of the reciprocating yoke 12.

Moreover, it will be understood that some degree of clearance is necessary between the eccentric means 14 and the track 13 formed in yoke 12, and that this clearance has been slightly exaggerated in FIGURE 3 (as in the preceding views) for convenience of illustration. Consequently, the eccentric means 14 is illustrated herein as contacting the upper wall on the upstroke (see FIGURE 3) and as contacting the lower wall 21 on the downstroke.

With reference to FIGURE 4, there is illustrated (generally as at 22 and 22′) holding means—a specific embodiment of which will hereinafter be described in detail—for positioning and holding the lubricant applicators 18 and 18′, respectively, in the manner and position as hereinbefore described. Moreover, it is understood that a quantity of grease 23, or other lubricant having a relatively-low viscosity, is usually packed around the Scotch yoke mechanism 10; but because of the reciprocatory movement of the yoke 12, in combination with a portion of the outward circle described by the rotation of the outermost point on the eccentric means 14, there is formed a grease channel (denoted generally as at 24) within the quantity of grease 23. While this quantity of grease 23 is not sufficient to properly lubricate the various components of the Scotch yoke mechanism 10 (especially such wearing components as the eccentric means 14 and track 13 in yoke 12), nevertheless, the grease channel 24 formed therein provides an ancillary advantage of tending to confine (to the track 13) the oil that is picked up by the eccentric means 14 in wiping, in sequence, against the lubricant applicators 18 and 18′. Such a film of oil therefore may be collected within the track 13 of the yoke 12, as illustrated at 25 (and 25′) in FIGURES 4 and 4a.

Moreover, when the yoke 12 is reciprocated rapidly, as for example in the order of 3000 strokes per minute, the oil that is picked up by the eccentric means 14 will tend to be sprayed or atomized in the form of a mist within the track 13 of the yoke 12. Examination of mechanisms built and tested in accordance with the teachings of the present invention, as depicted in FIGURE 4, reveals that the individual components, such as the eccentric means 14, track 13, and in general, the interior of the yoke 12, have the appearance of recently being sprayed by an oil mist, thus providing an excellent lubrication means directly at the critical wearing areas, and hence enhancing the life of the parts (in several noted cases) by many fold.

With reference to FIGURE 5, there is illustrated one specific embodiment of the teachings of the present invention, as applied to a Scotch yoke mechanism used in a portable electric jig saw 26. The jig saw 26 may have an overall design appearance such as is illustrated in the co-pending Downs design patent application, Serial No. 60,746, filed May 26, 1960, and assigned to the same assignee as the present invention. Moreover, the jig saw 26 includes a motor housing 27, switch handle 28, gear case 29, reciprocating shaft (again identified by the numeral 11), blade 30 secured to shaft 11, shoe plate 31, and shoe 32, the latter being described in detail in the co-pending McCarty et al. application, Serial No. 71,674, filed November 25, 1960, and assigned to the same assignee as the present invention. Moreover, within the gear case 29, there is a conventional armature pinion 33, which meshes with a gear 34 suitably journaled on a stub shaft 35.

The jig saw 26 is further provided with a Scotch yoke mechanism (likewise denoted herein by the numeral 10) for converting the rotary motion of the gear 34 into the reciprocating motion of the shaft 11. Various components of the Scotch yoke mechanism 10 are substantially identical to that as illustrated in FIGURES 1–4; hence, like numerals will hereinafter be used to identify like parts. Accordingly, the gear 34 is provided with a forward face 36, which carries a conventional crank pin 37; and it will be understood that the crank pin 37 is eccentric with respect to the axis of rotation of gear 34. Crank pin 37 in turn loosely carries a crank pin roller 38, and it will be understood that the crank pin 37 and crank pin roller 38 are substantially equivalent to the eccentric means 14 noted with respect to the description of FIGURES 1–4.

Crank pin roller 38 is in turn guided within the track 13 formed in the channel-shaped transverse yoke 12 (see FIGURE 6), and the yoke 12 is in turn secured to the reciprocating shaft 11 by brazing or other suitable means. The means for journalling the reciprocating shaft 11 within the gear case 29 may be conventional; hence, a specific illustration thereof may be omitted herein for ease of illustration.

With reference to FIGURES 5–9, a pair of identical oil wicks 39 and 40 (similar in puropse to the lubricant applicators 18 and 18' of FIGURES 3 and 4) are provided and are retained within the gear case 29 by means of respective L-shaped brackets 41 and 42. Preferably, the L-shaped brackets 41 and 42 are identical to each other and include a main body portion 43 and a pair of tangs 44 and 45 (see FIGURES 8 and 9). Each of the oil wicks (for example, 40) is positioned against the ledge or land 46 formed within gear case 29 (or 46' for oil wick 39); and respective retaining screws 47 and 48 pass through openings in the tangs 44 and 45 to engage corresponding recesses (one of which is shown in land 46, as at 49 in FIGURE 12) to secure the brackets, and hence the oil wicks 39 and 40. Preferably, but not necessarily, the jig saw 26 (or at least the gear case 29) is provided with a split-housing comprising complementary mating halves 50 and 51 (see FIGURES 6 and 7) so as to facilitate the mounting of the oil wicks 39 and 40 within the gear case 29. Moreover, as shown best in FIGURE 9, each of the oil wicks 39 and 40 has a curved undersurface 52 corresponding to the shape of the gear case 29, and further has a central hump 53 projecting beyond the opening 54, preformed between tangs 44 and 45 of bracket 42. The central hump 53 may be preformed originally with a central depression 55, but it will be appreciated (as hereinbefore mentioned) that such a central depression 55 (or one similar to it) will eventually be worn into the respective oil wicks 39 or 40. Moreover, means are provided for periodically repelenishing the supply of oil in the oil wicks 39 and 40, such means taking the convenient form (as shown more concisely in FIGURES 10 and 11) of an oil hole 56 in combination with a communicating oil duct 57 for each of the oil wicks 39 and 40.

Figure 7:
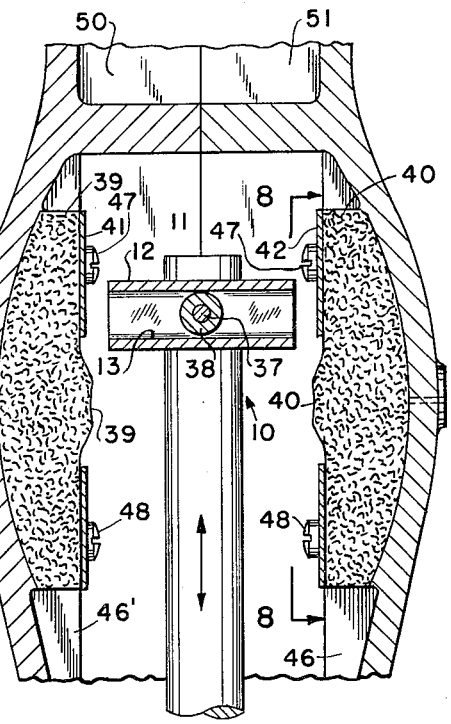
FIGURE 7 is a view corresponding to that of FIGURE 6, but showing the Scotch yoke mechanism in an alternate position.
Figure 8:
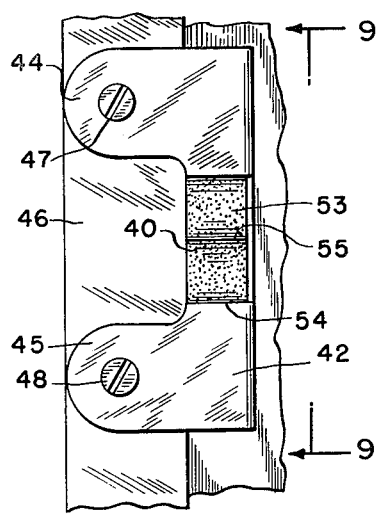
FIGURE 8 is a view taken along the lines of 8—8 of FIGURE 7, showing a mounting bracket for an oil wick.
Figure 9:
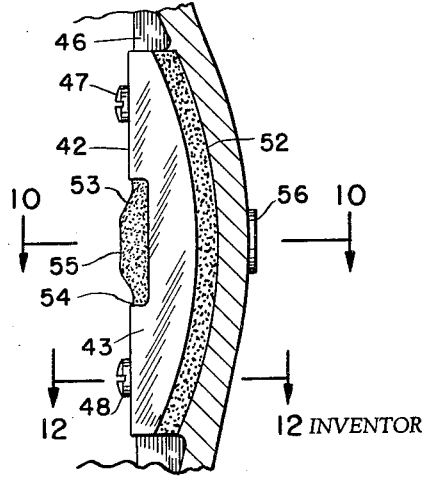
FIGURE 9 is a view taken along the lines 9—9 of FIGURE 8.

It will be appreciated, of course, that with respect to FIGURES 6 and 7, the quantity of grease 23 (as well as the grease channel 24), may be included for more efficient results, but are omitted herein for ease and convenience of illustration.

With reference to FIGURE 13, there is illustrated a first modification of the present invention, in which the yoke 12 mounted upon reciprocating shaft 11 has a pair of closed ends 58 and 59. Such a construction may result from having the yoke 12 formed in a single drawing operation, but of course, other methods of providing a pair of closed ends 58 or 59 are herein contemplated. A pair of oil wicks 60 and 61 are secured (by adhesive or other suitable means) within the yoke 12, one each of the oil wicks 60 and 61 being adjacent to a respective one of the pair of closed ends 58 and 59. Hence, it will be understood that as the eccentric means 14 is guided within the track 13 formed in the yoke 12, that at the extremities of travel of the eccentric means 14 (corresponding to the midpoints of travel of the reciprocating yoke 12) that the eccentric means 14 will contact a respective one of the pair of oil wicks 60 and 61, in sequence, so as to provide continuous lubrication means within the yoke 12. To apply this species of the present invention to the Scotch yoke mechanism 10 of jig saw 26 illustrated in FIGURE 5, the oil wicks 60 and 61 may each be formed from readily-available cylindrical lengths of felt of the same diameter as eccentric means and presaturated with a quantity of suitable oil. While means are not illustrated (for this species of the present invention) to periodically replenish the supply of oil in the oil wicks 60 and 61, nevertheless, the oil wicks 60 and 61 will still materially enhance the wear and reliability of the wearing components (such as the eccentric means 14 and track 13); and ntaurally, when the tool is disassembled for its usual periodic servicing, the oil wicks 60 and 61 may be replaced or merely refurnished with additional lubricant.

With reference to FIGURE 14, there is illustrated a second modification of the present invention, in which the yoke 12 has a pair of integral tabs 62 and 63, one each extending from a respective one of the pair of side walls 64 and 65 of the yoke 12, in combination with a pair of oil wicks 66 and 67. Each of the pair of oil wicks 66 and 67 is positioned within the zone of travel of the reciprocating yoke in the same manner as hereinbefore recited; and one of the pair of oil wicks, 66, is positioned near an open end 17 of the yoke 12 when the yoke is in its advanced position (for example the upstroke), while the other of the pair of oil wicks 67, is positioned near an open end 16 of the yoke 12 when the yoke is in its retracted position (the downstroke) as indicated by the phantom lines in FIGURE 14. Preferably, but not necessarily, each of the pair of tabs 62 and 63 is bent slightly inwardly towards the opposite side wall 64 or 65 of the yoke 12. Thus, as illustrated in FIGURE 15, as the yoke 12 reciprocates, each of the pair of tabs 62 and 63 will contact a corresponding one of the oil wicks 66 and 67, in sequence, at the advanced and retracted positions of the mechanism. In such a manner, the tabs 62 and 63 tend to compress a respective one of the pair of oil wicks, 66 and 67, so as to direct a jet or spray of oil towards within the track 13, and the bent (or curved) nature of the tabs 62 and 63 aids in allowing the oil that is picked up by the tab itself to flow back down into the yoke 12. Means may be provided, similar to that as hereinbefore described, to replenish the supply of oil to the pair of oil wicks 66 and 67.

With reference to FIGURE 15, there is illustrated a third modification of the preesnt invention, in which a pair of oil wicks 68 and 69 are provided, and the eccentric means 14 is allowed to extend slightly beyond each of the open ends 16 and 17 of the yoke 12 so as to contact a respective one of the pair of oil wicks 68 and 69, in sequence, at the midpoint of travel of the reciprocating yoke 12. Each of the pair of oil wicks 68 and 69 may comprise a short length of cylindrically-shaped felt material having an inwardly-projecting curved tip 70; and for ease of assembly, a spring 71 is wound tightly around the oil wick, 68 or 69, and threaded into a recess having a corresponding spring-thread 72, it being noted that an oil hole 56 and oil duct 57 is provided in the manner as hereinbefore recited.

Obviously, many minor modifications may be made without departing from the basic spirit of the present invention; therefore, it is to be understood that within the scope of the appended claims the invention may be practiced other than as specifically described.

I claim:

1. In combination a mechanism of the Scotch yoke type, said mechanism including a reciprocating yoke, said yoke including a track having at least one open end, said mechanism further including eccentric means guided within said track, and lubricant means comprising a lubrication applicator positioned at least partially within the zone of travel of said reciprocating yoke and near the plane of travel of one of said pair of open ends of said track, and means to allow said eccentric means to extend slightly beyond said one of said pair of open ends of said track at least once during the operating cycle of said mechanism to contact said lubricant applicator.

2. The combination as defined in claim 1, wherein said lubricant applicator comprises an oil wick.

3. The combination as defined in claim 1, wherein said eccentric means comprises a crank pin, and wherein said crank pin extends beyond said one of said pair of open ends of said track by an amount equal to less than the radius of said crank pin.

4. The combination as defined in claim 1, wherein said eccentric means contacts said lubricant applicator at the midpoint of travel of said reciprocating yoke.

5. In combination a mechanism of the Scotch yoke type, said mechanism including a reciprocating yoke, said yoke including a track having a pair of open ends, said mechanism further including a crank pin guided within said track, and lubrication means comprising at least one oil wick positioned within the zone of travel of said reciprocating yoke and near the plane of travel of one of said pair of open ends of said track, and means to allow said crank pin to extend beyond said one of said pair of open ends of said track by an amount equal to less than the radius of said crank pin to contact said oil wick at the midpoint of travel of said reciprocating yoke, said oil wick having a portion which engages said crank pin and which includes a depression formed on a radius from the center of said reciprocating yoke at the midpoint of its travel.

6. In combination a mechanism of the Scotch yoke type, said mechanism including a reciprocating yoke, said yoke including a track having a pair of open ends, said mechanism further including a crank pin guided within said track, and lubrication means comprising a pair of oil wicks positioned within the zone of travel of said reciprocating yoke, one each near the plane of travel of a respective open end of said track, and means to allow said crank pin to extend beyond each of said pair of open ends of said track by an amount equal to less than the radius of said crank pin to wipe against a respective one of said pair of oil wicks at the respective midpoints of travel of the reciprocating yoke.

7. In combination a mechanism of the Scotch yoke type, said mechanism including a reciprocating yoke, said yoke including a track having a pair of open ends, said mechanism further including a crank pin guided within said track, and lubrication means comprising a pair of oil wicks positioned within the zone of travel of said reciprocating yoke, one each near the plane of travel of a respective open end of said track, and means to allow said crank pin to extend beyond each of said pair of open ends of the track, in sequence, by an amount equal to less than the radius of said crank pin to wipe against a respective one of said pair of oil wicks at the respective midpoints of travel of said reciprocating yoke, each of said pair of oil wicks having a portion which wipes against said crank pin and which includes a depression formed on a radius from the center of said reciprocating yoke at the midpoint of its travel.

8. In combination a mechanism of the Scotch yoke type, said mechanism including a reciprocating yoke, said yoke including a track having a pair of open ends, said mechanism further including a crank pin guided within said track, and lubrication means comprising a pair of oil wicks positioned within the zone of travel of said reciprocating yoke, one each near the plane of travel of a respective open end of said track, and means to allow said crank pin to extend beyond each of said pair of open ends of the track, in sequence, by an amount equal to less than the radius of said crank pin to wipe against a respective one of said pair of oil wicks at the respective midpoints of travel of said reciprocating yoke, each of said pair of oil wicks having a portion which wipes against said crank pin and which includes a depression formed on a radius from the center of said reciprocating yoke at the midpoint of its travel, and a quantity of lubricant having a relatively-low viscosity packed around the mechanism and including therein a channel formed by the movement of said reciprocating yoke, said channel tending to confine the quantity of oil periodically picked up by said crank pin and deposited within said track.

9. A power-operated cutting tool, comprising, a housing, a source of motive power within said housing, a reciprocating shaft, a transverse yoke secured to said reciprocating shaft, said yoke having a track and further having a pair of open ends, eccentric means guided within said track, means connecting said eccentric means to said source of motive power, and lubrication means, comprising, a pair of oil wicks, means to allow said eccentric means to extend slightly beyond each of said pair of open ends of said track to wipe against a respective one of said pair of oil wicks, and means to secure said pair of oil wicks within said housing.

10. A power-operated cutting tool, comprising, a housing, a source of motive power within said housing, a reciprocating shaft, a transverse yoke secured to said reciprocating shaft, said yoke having a track and further having a pair of open ends, eccentric means guided within said track, means connecting said eccentric means to said source of motive power and lubrication means, comprising, a pair of oil wicks, one each positioned within the zone of travel of said yoke and near the respective plane of travel of one each of said pair of open ends of said track, means to allow said eccentric means to extend slightly beyond each of said pair of open ends of said track to wipe against a respective one of said pair of oil wicks, and means to secure said pair of oil wicks within said housing.

11. A power-operated cutting tool, comprising, a housing, a source of motive power within said housing, a reciprocating shaft, a transverse yoke secured to said reciprocating shaft, said yoke having a track and further having a pair of open ends, a crank pin roller guided within said track, means connecting said crank pin roller to said source of motive power, and lubrication means, comprising, a pair of oil wicks, one each positioned within the zone of travel of said yoke and near the respective plane of travel of one each of said pair of open ends of said track, means to allow said crank pin roller to extend slightly beyond each of said pair of open ends of said track at certain times during the operating cycle of said tool to wipe against a respective one of said pair of oil wicks, means to secure said pair of oil wicks within said housing, and means to replenish the supply of oil to said pair of oil wicks.

12. A power-operated cutting tool as defined in claim 11, wherein said means connecting said crank pin roller to said source of motive power comprises, a pinion, a gear meshing with said pinion, and a crank pin formed on the forward face of said gear, said crank pin roller being loosely carried by said crank pin.

13. A power-operated cutting tool as defined in claim 11, wherein said crank pin roller extends beyond each of said open ends of said track by an amount equal to less than the radius of the roller to wipe against a respective one of said pair of oil wicks at the midpoints of travel of said reciprocating shaft.

14. A power-operated cutting tool as defined in claim 11, wherein said means to secure said pair of oil wicks within said housing includes a pair of brackets, one for each of said pair of oil wicks.

15. A power-operated cutting tool as defined in claim 11, wherein said means to replenish the supply of oil to said pair of oil wicks, comprises, a pair of oil holes provided on opposite faces of said housing, and passages interconnecting said pair of oil holes with a respective one of said pair of oil wicks.

16. A power-operated cutting tool as defined in claim 14, wherein each of said pair of brackets includes a pair of mounting tangs.

17. In a power-operated cutting tool, the combination of: a split housing having complementary mating halves, a motion-translating mechanism including eccentric means within said split housing, and lubrication means for said motion-translating mechanism, said lubricant means comprising a pair of lubrication applicators, one each secured within a respective one of said complementary mating halves of said split housing, and said eccentric means contacting said lubricant applicators, in sequence, and at certain times during the operating cycle of said mechanism, thereby to transfer lubricant to said eccentric means.

18. In a power-operated cutting tool, the combination of: a split housing having complementary mating halves, a motion-translating mechanism of the Scotch yoke type within said split housing, said motion translating mechanism including a reciprocating yoke provided with a track having a pair of open ends and further including eccentric means guided within said track, a pair of oil wicks, one each secured within a respective one of said complementary mating halves of said split housing, and means to allow said eccentric means to extend slightly beyond each of said pair of open ends of said track to wipe against a respective one of said pair of oil wicks only at certain times during the operating cycle of said motion-translating mechanism.

19. In a power-operated cutting tool, the combination of: a split housing having complementary mating halves, a motion-translating mechanism of the Scotch yoke type within said split housing, said motion-translating mechanism including a reciprocating yoke provded with a track having a pair of open ends and further including eccentric means guided within said track, a pair of oil wicks, one each secured within a respective one of said complementary mating halves of said split housing, means to allow said eccentric means to extend slightly beyond each of said pair of open ends of said track at certain times during the operating cycle of said motion-translating mechanism, and means including a pair of oil holes to replenish the supply of oil in said pair of oil wicks, on each of said pair of oil holes being provided in a respective one of said complementary mating halves of said split housing.

20. In a power-operated cutting tool, the combination of: a split housing having complementary mating halves, a motion-translating mechanism of the Scotch yoke type within said split housing, said motion-translating mechanism including a reciprocating yoke provided with a track having a pair of open ends and further including a crank pin roller guided within said track, a pair of oil wicks, means including a pair of brackets to secure one each of said pair of oil wicks within a respective one of said complementary mating halves of said split housing, means to allow said crank pin roller to extend beyond each of said pair of open ends of said track by an amount equal to less than the radius of the roller to wipe against a respective one of said pair of oil wicks during the midpoints of travel of said reciprocating yoke, and means including a pair of oil holes to replenish the supply of oil in said pair of oil wicks, one each of said pair of oil holes being provided in a respective one of said complementary mating halves of said split housing.

21. In combination a mechanism of the Scotch yoke type, said mechanism including a reciprocating yoke, said yoke being provided with a track having a pair of open ends, said mechanism further including eccentric means guided within said track, and lubrication means comprising a pair of oppositely-disposed oil wicks positioned within the vicinity of the midpoint of travel of said reciprocating yoke, one each of said pair of oil wicks near a respective open end of said reciprocating yoke, each of said pair of oil wicks having an inwardly projecting tip, and means to allow said eccentric means to extend slightly beyond each of said open ends of said track to wipe against said tip of a respective one of said oil wicks, in sequence, at the midpoint of travel of said reciprocating yoke.

22. The combination as defined in claim 21, wherein each of said pair of oil wicks has a spring wound tightly around it, and wherein a housing is provided including a pair of recesses each provided with a corresponding spring-thread, whereby each of said pair of oil wicks may be secured in its preselected position.

References Cited in the file of this patent

UNITED STATES PATENTS

| | | |
|---|---|---|
| 1,425,192 | Gase | Aug. 8, 1922 |
| 2,388,484 | Hewes | Nov. 6, 1945 |
| 2,841,933 | Kaufmann | July 8, 1958 |
| 2,869,231 | Gurz | Jan. 20, 1959 |
| 2,902,067 | Oakley | Sept. 1, 1959 |
| 2,970,484 | Springer | Feb. 7, 1961 |

UNITED STATES PATENT OFFICE

CERTIFICATE OF CORRECTION

Patent No. 3,033,312                           May 8, 1962

Sherwood G. Enders

It is hereby certified that error appears in the above numbered patent requiring correction and that the said Letters Patent should read as corrected below.

Column 1, line 26, for "crank pin roller" read -- crank pin and roller --; same line 26, for "is" read -- are --; column 4, line 21, for "apprecited" read -- appreciated --; column 5, line 69, for "repelenishing" read -- replenishing --; column 6, line 34, for "ntaurally" read -- naturally --; line 70, for "preesnt" read -- present --; column 7, line 19, for "lubricant means" read -- lubrication means --; lines 19 and 20, for "lubrication applicator" read -- lubricant applicator --; column 9, line 28, for "lubricant" read -- lubrication --; line 29, for "lubrication applicators" read -- lubricant applicators --; line 55, for "provded" read -- provided --.

Signed and sealed this 27th day of November 1962.

(SEAL)

Attest:    ESTON G. JOHNSON
ERNEST W. SWIDER

Attesting Officer

DAVID L. LADD

Commissioner of Patents